United States Patent
Moran et al.

(10) Patent No.: US 6,500,873 B2
(45) Date of Patent: Dec. 31, 2002

(54) POLYVINYL CHLORIDE RESINS AND METHOD OF PREPARATION AND USE IN THE PRODUCTION OF WHITENED POLYVINYL CHLORIDE FOAM

(75) Inventors: Michael T. Moran, Reading, PA (US); Thomas E. Moses, Schwenksville, PA (US); Sherry Rohn Clancy, Pottstown, PA (US)

(73) Assignee: Occidental Chemical Corporation, Dallas, TX (US)

( * ) Notice: Subject to any disclaimer, the term of this patent is extended or adjusted under 35 U.S.C. 154(b) by 0 days.

(21) Appl. No.: 09/947,662

(22) Filed: Sep. 6, 2001

(65) Prior Publication Data

US 2002/0056936 A1 May 16, 2002

Related U.S. Application Data

(60) Provisional application No. 60/230,659, filed on Sep. 7, 2000.

(51) Int. Cl.$^7$ .................................................. C08J 9/10
(52) U.S. Cl. ............................. 521/73; 521/93; 521/95; 521/89; 521/145
(58) Field of Search ............................ 521/73, 95, 145, 521/89, 93

(56) References Cited

U.S. PATENT DOCUMENTS

| | | | | |
|---|---|---|---|---|
| 3,945,955 | A | * | 3/1976 | Ihde, Jr. |
| 3,959,188 | A | * | 5/1976 | McBriar et al. |
| 3,970,620 | A | * | 7/1976 | Ihde, Jr. |
| 4,228,245 | A | * | 10/1980 | Morgan et al. |
| 4,381,962 | A | * | 5/1983 | Sato et al. |

* cited by examiner

*Primary Examiner*—Morton Foelak
(74) *Attorney, Agent, or Firm*—Anne E. Brookes; Joseph D. Yao

(57) ABSTRACT

Polyvinyl chloride resin compositions and methods of preparation and use thereof for increasing the degree of whiteness in finished polyvinyl chloride foam. The resin compositions contain sulfur compounds selected from sulfonic acid derivatives, sulfinic acid derivatives, and mercapto acetic acid sodium salt, and optionally contain water soluble salts and/or t-butyl hydroperoxide.

7 Claims, No Drawings

POLYVINYL CHLORIDE RESINS AND METHOD OF PREPARATION AND USE IN THE PRODUCTION OF WHITENED POLYVINYL CHLORIDE FOAM

RELATED APPLICATIONS

This application is entitled to and hereby claims the filing date of provisional application No. 60/230,659, "METHOD FOR PRODUCING A PVC RESIN THAT PROVIDES ENHANCED PERFORMANCE CHARACTERISTICS FOAM APPLICATIONS" Filed Sep. 7, 2000 by Michael T. Moran, Thomas E. Moses and Sherry Rohn Clancy.

FIELD OF THE INVENTION

This invention relates to polyvinyl chloride (PVC) dispersion and blending resin compositions and to preparation and use of such compositions in the production of whitened PVC foam.

BACKGROUND OF THE INVENTION

Polyvinyl chloride (PVC) foam processes often require a high degree of whiteness in the finished foam product without sacrificing process performance properties such as activation levels, cell structure, overblow protection and the like. The PVC resin used in the process is one of the ingredients primarily responsible for these performance characteristics. Previously, it has been attempted to control the desired characteristics by the use of additives, such as blowing agents, activators, pigments such as titanium dioxide and the like.

It is clearly desirable to achieve the improved whiteness without the use of or with the use of reduced quantities of these added materials.

SUMMARY OF THE INVENTION

According to the present invention a whitened PVC chloride foam is produced by incorporating in a plastisol containing dry, particulate PVC dispersion resin;
  (i) from about 0.01 to about 5 parts by weight per 100 parts by weight of dry, particulate polyvinyl chloride dispersion resin of at least one additive selected from the group consisting of:
    a) a sulfonic acid derivative having the formula R—$SO_3$M wherein R is an alkyl, alkylaryl or an arylalkyl group containing from 1 to 12 carbon atoms which may also contain one or more other functional groups such as hydroxyl, carboxyl and the like and wherein M is selected from hydrogen and monovalent metals;
    b) a sulfinic acid derivative having the formula R—$SO_2$M wherein R is an alkyl, alkylaryl or an arylalkyl group containing from 1 to 12 carbon atoms which may also contain one or more other functional groups such as hydroxyl, carboxyl or the like and wherein M is selected from hydrogen and monovalent metals; and
    c) mercapto acetic acid sodium salt; and,
  (ii) optionally incorporating at least one second additive selected from the group consisting of
    a) at least one water soluble metal salt selected from the group consisting of water soluble salts of alkali metals, alkaline-earth metals and transition metals; and
    b) t-butyl hydroperoxide; and heating the plastisol to effect expansion into whitened PVC foam.

The invention further comprises a method of producing whitened PVC chloride foam by incorporating in a plastisol containing dry, particulate PVC dispersion resin and dry, particulate PVC blending resin;
  (i) from about 0.01 to about 5 parts by weight per 100 parts by weight of dry, particulate polyvinyl chloride blending resin of at least one additive selected from the group consisting of:
    a) a sulfonic acid derivative having the formula R—$SO_3$M wherein R is an alkyl, alkylaryl or an arylalkyl group containing from 1 to 12 carbon atoms which may also contain one or more other functional groups such as hydroxyl, carboxyl and the like and wherein M is selected from hydrogen and monovalent metals;
    b) a sulfinic acid derivative having the formula R—$SO_2$M wherein R is an alkyl, alkylaryl or an arylalkyl group containing from 1 to 12 carbon atoms which may also contain one or more other functional groups such as hydroxyl, carboxyl or the like and wherein M is selected from hydrogen and monovalent metals; and
    c) mercapto acetic acid sodium salt; and,
  (ii) optionally incorporating at least one second additive selected from the group consisting of
    a) at least one water soluble metal salt selected from the group consisting of water soluble salts of alkali metals, alkaline-earth metals and transition metals; and
    b) t-butyl hydroperoxide; and heating the plastisol to effect expansion into whitened PVC foam.

The invention further comprises a dry, particulate PVC dispersion resin for use in the production of whitened PVC foam comprising vinyl chloride polymer and;
  (i) from about 0.01 to about 5 parts by weight per 100 parts by weight of dry, particulate PVC dispersion resin of at least one additive selected from the group consisting of:
    a) a sulfonic acid derivative having the formula R—$SO_3$M wherein R is an alkyl, alkylaryl or an arylalkyl group containing from 1 to 12 carbon atoms which may also contain one or more other functional groups such as hydroxyl, carboxyl or the like and wherein M is selected from hydrogen and monovalent metals;
    b) a sulfinic acid derivative having the formula R—$SO_2$M wherein R is an alkyl, alkylaryl or an arylalkyl group consisting from 1 to 12 carbon atoms which may also contain other functional groups such as hydroxyl, carboxyl and the like and wherein M is selected from the group consisting of hydrogen and monovalent metals;
    c) mercapto acetic acid sodium salt; and,
  (ii) optionally containing at least one second additive selected from the group consisting of:
    a) a water soluble metal salt selected from the group consisting of water soluble salts of mono- and divalent alkali metals, alkaline-earth metals and transition metals; and
    b) t-butyl hydroperoxide.

The invention further comprises a dry, particulate PVC blending resin for use in a plastisol containing dry, particulate PVC dispersion resin and dry particulate PVC blending resin for the production of whitened PVC foam, said dry, particulate PVC blending resin comprising vinyl chloride polymer and;
  (i) from about 0.01 to about 5 parts by weight per 100 parts by weight of dry, particulate PVC blending resin of at least one additive selected from the group consisting of:

a) a sulfonic acid derivative having the formula R—SO$_3$M wherein R is an alkyl, alkylaryl or an arylalkyl group containing from 1 to 12 carbon atoms which may also contain one or more other functional groups such as hydroxyl, carboxyl or the like and wherein M is selected from hydrogen and monovalent metals;

b) a sulfinic acid derivative having the formula R—SO$_2$M wherein R is an alkyl, alkylaryl or an arylalkyl group consisting from 1 to 12 carbon atoms which may also contain other functional groups such as hydroxyl, carboxyl and the like and wherein M is selected from the group consisting of hydrogen and monovalent metals;

c) mercapto acetic acid sodium salt; and, (ii) optionally cocomprising at least one second additive selected from the group consisting of:

a) at least one water soluble metal salt selected from the group consisting of water soluble salts of alkali metals, alkaline-earth metals and transition metals; and b) t-butyl hydroperoxide.

The invention further comprises a PVC plastisol for use in the production of a whitened PVC foam comprising dry, particulate PVC dispersion resin and from;

(i) about 0.01 to about 5 parts by weight per 100 parts by weight of dry, particulate PVC dispersion resin of at least one additive selected from the group consisting of:

a) a sulfonic acid derivative having the formula R—SO$_3$M wherein R is an alkyl, alkylaryl or an arylalkyl group containing from 1 to 12 carbon atoms which may also contain one or more other functional groups such as hydroxyl, carboxyl or the like and wherein M is selected from hydrogen and monovalent metals;

b) a sulfinic acid derivative having the formula R—SO$_2$M wherein R is an alkyl, alkylaryl or an arylalkyl group consisting from 1 to 12 carbon atoms which may also contain other functional groups such as hydroxyl, carboxyl and the like and wherein M is selected from the group consisting of hydrogen and monovalent metals;

c) mercapto acetic acid sodium salt; and, (ii) optionally comprising at least one second additive selected from the group consisting of:

a) at least one water soluble metal salt selected from the group consisting of water soluble salts of alkali metals, alkaline-earth metals and transition metals; and b) t-butyl hydroperoxide.

The invention further comprises a whitened PVC foam produced by heating a plastisol comprising a dry, particulate PVC dispersion resin and;

(i) from about 0.01 to about 5 parts by weight per 100 parts by weight of dry, particulate PVC dispersion resin of at least one additive selected from the group consisting of:

a) a sulfonic acid derivative having the formula R—SO$_3$M wherein R is an alkyl, alkylaryl or an arylalkyl group containing from 1 to 12 carbon atoms which may also contain one or more other functional groups such as hydroxyl, carboxyl or the like and wherein M is selected from hydrogen and monovalent metals;

b) a sulfinic acid derivative having the formula R—SO$_2$M wherein R is an alkyl, alkylaryl or an arylalkyl group consisting from 1 to 12 carbon atoms which may also contain other functional groups such as hydroxyl, carboxyl and the like and wherein M is selected from the group consisting of hydrogen and monovalent metals;

c) mercapto acetic acid sodium salt; and, (ii) optionally comprising at least one second additive selected from the group consisting of:

a) at least one water soluble metal salt selected from the group consisting of water soluble salts of alkali metals, alkaline-earth metals and transition metals; and b) t-butyl hydroperoxide.

DESCRIPTION OF PREFERRED EMBODIMENTS

According to the present invention, improved foam characteristics of a PVC foam can be achieved by adding at least one sulfur compound selected from sulfonic acid derivatives, sulfinic acid derivatives, and mercapto acetic acid sodium salt, and optionally adding at least one of a water soluble metal salt and t-butyl hydroperoxide, directly or indirectly, to at least one of a PVC dispersion resin polymerization recipe or latex, or to a PVC blending resin polymerization recipe or slurry, or to a PVC plastisol containing a PVC dispersion resin and optionally containing a PVC blending resin and heating the plastisol to produce a whitened foam. The term "dispersion resin" is used to describe any PVC resin that is made by an emulsion, microsuspension or HYBRID process primarily for use in the production of PVC plastisols. HYBRID is a registered trademark of Occidental Chemical Corporation for its PVC dispersion resin polymerization process. Typically the plastisol is heated to a temperature from about 180 to about 210° C. for a time from about 0.75 to about 1.75 minutes.

Typically the plastisol contains from about 15 to about 75 weight percent of the PVC dispersion resin based upon the total weight of the plastisol constituents. The PVC dispersion resin comprises PVC resin particles having an average particle diameter from about 0.1 to about 10 microns. The plastisol may also contain PVC blending resin. Typically the PVC blending resin comprises PVC resin particles having an average particle diameter from about 20 to about 40 microns and is present in the plastisol in an amount up to about 50 weight percent of the dry PVC resin in the plastisol.

According to the present invention, the sulfur compounds are used alone or in combination with water soluble metal salts and/or t-butyl hydroperoxide. The sulfur compounds are selected from the group consisting of sulfonic acid derivatives, sulfinic acid derivatives, and mercapto acetic acid sodium salt. The sulfonic acid derivatives generally have the formula R—SO$_3$M wherein R is an alkyl, alkylaryl or arylalkyl group containing from 1 to 12 carbon atoms which may also contain one or more other functional groups such as hydroxyl, carboxyl, or the like and wherein M is selected from hydrogen and monovalent metals. Preferably M is selected from hydrogen, sodium and potassium.

The sulfinic acid derivatives generally have the formula R—SO$_2$M, wherein R is an alkyl, alkylaryl or arylalkyl group containing from 1 to 12 carbon atoms which may also contain one or more other functional groups such as hydroxyl, carboxyl, or the like and wherein M is selected from the group consisting of hydrogen and monovalent metals. Preferably M is selected from hydrogen, sodium, and potassium.

Mercapto acetic acid sodium salts are also effective.

These sulfur compounds are effective whiteners when used alone according to the present invention. These sulfur compounds may be added to a polymerization recipe for the production of a PVC dispersion resin or a PVC blending resin, or they may be added as a post additive to polymerized latex in the production of the PVC dispersion resin or slurry in the production of the PVC blending resin. The sulfur compounds may also be added to the plastisol. In each instance, it is necessary that the sulfur compounds be relatively uniformly distributed throughout the material. The sulfur compounds are added in an amount equal to from about 0.01 to about 5 parts by weight per hundred parts by weight of dry PVC dispersion resin in the plastisol used for the production of the PVC foam. The best results are obtained in the 0.05 to 0.5 parts per hundred parts of dry PVC dispersion resin range. This is dependent on the amount of PVC dispersion resin used in the plastisol. Addition of these sulfur compounds at this level increases the whiteness of the PVC foam produced from the plastisol.

The preferred sulfur compounds are sodium methane sulfoxylate, sodium formaldehyde sulfoxylate, sodium formaldehyde bisulfite, sodium toluene sulfoxylate, sodium acetone bisulfite, sodium methane bisulfite, and mercapto acetic acid sodium salt.

Of these, sodium methane sulfonate and sodium formaldehyde sulfoxylate are preferred.

The at least one water soluble metal salt is generally a water soluble salt of a mono- or divalent alkali metal, alkaline-earth metal or transition metal. Preferably the metal is sodium, potassium, calcium, zinc, tin, nickel or cobalt. Typically, the salt is a chloride, chlorate, hydroxide, nitrate, borate, iodate, thiosulfate or sulfate, although other salts may be used as well, provided they have the desired solubility. The term "water soluble salts" refers to the ability of the salt to dissolve in the aqueous PVC dispersion in which it is used.

The metal salts and/or t-butyl hydroperoxide may be added to a polymerization recipe for the production of a PVC dispersion resin or a PVC blending resin, or they may be added as a post additive to polymerized latex in the production of the PVC dispersion resin or slurry in the production of the PVC blending resin. The metal ions may also be added to the plastisol in an oil soluble form. In each instance, it is necessary that the salts be relatively uniformly distributed throughout the material. Typically, the metal salts and/or the t-butyl hydroperoxide are added in an amount at least about 0.001 parts by weight per 100 parts by weight of dry PVC dispersion resin in the plastisol. Preferably, the metal salts and/or the t-butyl hydroperoxide are added in an amount of from about 0.01 to about 0.1 parts by weight of dry PVC dispersion resin in the plastisol.

The use of metal salts, when used alone, is effective to reduce the activation temperature during the foam curing process. The use of at least one of the metal salts and the sulfur compounds in combination is effective to synergistically improve the color and reduce the activation temperature required in the production of the PVC foam.

Use of metal salts alone shows noticeable improvement in foam activation temperature and use of the sulfur compounds alone shows noticeable improvement in foam whiteness. This improvement in the color and activation temperature will allow formulators to use lower levels of known additives, such as blowing agent, activator and titanium oxide. The use of such known additives is considered to be well known and need not be discussed further.

Desirably, the sulfur compounds and the metal salts or and/or t-butyl hydroperoxide are used in combination for best results. The use of these additives in combination results in a significant and synergistic improvement in the whiteness level and a reduction in the activation temperature, which is achievable in the production of a PVC foam. In tests of various PVC foam formulations, it was observed that the compositions and method of the present invention are effective to result in improvements in activation temperatures and in whiteness in all instances. While a variety of proprietary PVC formulations were evaluated, the results indicated that the improvement with all formulations was substantially the same. These results were also readily observed using a standard generic foam formula such as:

|  | Parts by weight |
|---|---|
| PVC dispersion resin | 70 |
| PVC blending resin | 30 |
| DOP (dioctyl phthalate) | 55 |
| $TiO_2$ (whitener) | 5 |
| $CaCO_3$ | 25 |
| Azodicarbonamide ($N_2$ release agent, blowing agent) | 2 |
| Zinc oxide (activator) | .05 |
| Texanol isobutyrate* | 5 |

*supplied as KODAFLEX TXIB. KODAFLEX TXIB is a trademark of Eastman Chemicals for 2,2,4-trimethyl-1,3-pentanediol diisobutyrate plasticizer It will be noted that in the general foam formula, both a PVC dispersion resin and a PVC blending resin are included in the plastisol. It will also be noted that an oil (plasticizer), dioctyl phthalate, is also included. This formulation is representative of standard formulations used to produce the plastisols used for the production of PVC foam.

It is desirable to produce either the PVC dispersion resin or the PVC blending resin to include the desired quantity of the sulfur compounds and water soluble metal salts and/or t-butyl hydroperoxide so that in the plastisol the added materials, i.e., the sulfur compounds and the metal salt or t-butyl hydroperoxide, are present in the plastisol in the ranges discussed above.

The use of the PVC dispersion resin or the PVC blending resin containing the added materials of the present invention to produce a plastisol clearly results in the presence of the desired quantities of added materials in the plastisol. As described below in the examples, the PVC dispersion resin and the PVC blending resin are dried using a spray drying or an equivalent process. The resulting resins may then be mixed into the plastisol foam formulations.

The use of these plastisols then results in the production of a foam, which is whiter and which can be produced at a lower activation temperature than comparable formulations, which do not include the additives of the present invention.

The effectiveness of the present invention is demonstrated in the tests shown below in Example I.

EXAMPLE I

In tests using the proprietary formulations and the generic foam formula, PVC dispersion lattices were polymerized using proprietary recipes. Additives of the present invention were either incorporated into the polymerization process or added to the latex after polymerization. The latex was then dried using a spray drying process. The resulting resins were then mixed into plastisol foam formulations. The plastisols were cast onto an organic felt substrate using a 10 mil Bird bar. The construction (the deposited plastisol) was then gelled for 10 seconds at 200° C. After cooling, a PVC plastisol topcoat was cast on top of the foam layer using a 10 mil Bird bar. The entire construction was then fused for times ranging from 1 minute to about 1 minute 45 seconds.

The data in Table I was prepared for comparison purposes and used a 1 minute 30 second curing time. After curing, the samples were allowed to cool and the color of the resulting foam was measured using a Hunter Color Quest Sphere II with DP-9000 colorimeter supplied by Hunter Associates, Reston, Va. Comparisons were made to the same recipes without the added materials according to the present invention. Proprietary formulations were used for much of the testing. The color improvement due to the additives of the present invention was evident in all the formulations tested, including the generic foam formulation above. The test results are shown in Table 1.

TABLE I

| Metal | (1) | Sulfur cpd | (1) | Δ b | Δ Yid | Improvement over control |
|---|---|---|---|---|---|---|
| KCl | 0.05 | SMS | 0.10 | −.35 | −7.8 | ave. |
| KCl | 0.02 | SMS | 0.10 | −3.2 | −7.2 | |
| n/a | n/a | SMS | 0.10 | −3.1 | −6.9 | |
| CoCl₂ | 0.09 | SFS | 0.10 | −3.0 | −6.3 | |
| NiCl₂ | 0.05 | SFS | 0.10 | −2.4 | −5.3 | |
| CoCl₂ | 0.05 | SFS | 0.10 | −2.4 | −5.2 | |
| NaBO₃ | 0.02 | SFS | 0.10 | −2.4 | −5.0 | |
| NiCl₂ | 0.03 | SFS | 0.10 | −2.3 | −5.1 | |
| KCl | 0.05 | SFBS | 0.10 | −2.1 | −4.8 | ave. |
| TBHP | 0.02 | SFS | 0.20 | −2.1 | −4.6 | ave. |
| KIO₃ | 0.02 | SFS | 0.10 | −2.1 | −4.4 | |
| TBHP | 0.04 | SFS | 0.10 | −2.0 | −4.5 | |
| KOH | 0.05 | SFS | 0.10 | −2.0 | −4.3 | ave. |
| KCl | 0.05 | SFS | 0.10 | −2.0 | −4.3 | ave. |
| KCl | 0.05 | SFS | 0.10 | −2.0 | −4.2 | |
| NaClO₃ | 01.02 | SFS | 0.10 | −2.0 | −4.1 | |
| KCl | 0.05 | SABS | 0.10 | −1.9 | −4.1 | |
| TBHP | 01.04 | SFS | 0.20 | −1.9 | −4.0 | |
| BaCl₂ | 0.14 | SFS | 0.10 | −1.7 | −3.8 | |
| n/a | n/a | SFS | 0.20 | −1.7 | −3.8 | |
| NaCl | 0.05 | SFS | 0.10 | −1.7 | −3.6 | |
| TBHP | 0.02 | SFS | 0.10 | −1.6 | −3.5 | ave. |
| TBHP | 0.01 | SFS | 0.10 | −1.6 | −3.3 | |
| n/a | n/a | SFS | 0.20 | −1.5 | −3.3 | ave. |
| H₂O₂ | 0.02 | SFS | 0.10 | −1.2 | −2.7 | |
| KOC(O)CH₃ | 0.05 | SF | 0.10 | −1.2 | −2.6 | |
| ZnCl₂ | 0.05 | SFS | 0.10 | −1.2 | −2.4 | |
| BaCl₂ | 0.05 | SFS | 0.10 | −1.1 | −2.4 | |
| CaCl₂ | 0.05 | SF | 0.10 | −1.1 | −2.4 | |
| K₂S₂O₈ | 0.02 | SFS | 0.10 | −1.0 | −2.3 | |
| SnCl₂ | 0.05 | SFS | 0.10 | −1.0 | −2.2 | |
| KCl | 0.02 | SMBS | 0.10 | −0.9 | −1.9 | |
| KCl | 0.05 | n/a | 0.10 | −0.7 | −1.6 | |
| KCl | 0.05 | NaO₂CCH₂SH | 0.10 | −0.6 | −1.4 | |
| KCl | 0.05 | Na₂SO₃ | 0.10 | −0.1 | −0.4 | | ave. - average of several tests
SMS - sodium methane sulfoxylate
SFS - sodium formaldehyde sulfoxylate
STS - sodium toluene sulfoxylate
SFBS - sodium formaldehyde bisulfite
(1) - parts per 100 parts of dry PVC resin by weight
TBHP - t - butyl hydroperoxide
SABS - sodium acetone bisulfite
SMBS - sodium methane bisulfite
NaO₂CCH₂SH - mercapto acetic acid, sodium salt Table I summarizes the effects of the various additives on foam color. The levels of each additive are shown and the improvements in color over the base resin are expressed as delta values. The b value and Yellowness Index (Yid) are indications of the yellowness/whiteness of the foam. The lower the value, the less yellow the foam. It is generally accepted that differences of less than 0.5 on the b scale and less than 0.8 on the Yid scale are not significant.

As an alternative to the use of the metal salts, t-butyl hydroperoxide may be used alone or in combination with the other metal salts.

EXAMPLE II

Activation rates were also observed during the curing of the foam. Table II shows the gas decomposition in a representative treated resin, which has been treated by comparison to an untreated resin. Table II shows the gas decomposition peak as the temperature at which the gas decomposition occurs. It will be observed that the activation is at a lower temperature with the treated resin.

TABLE II

| Resin | Gas Decomposition Peak, uninhibited (deg. C.) |
|---|---|
| Untreated | 194.03 |
| Treated | 189.03 |

The test results in Table II were determined by differential scanning calorimetry of foam formulas using a treated and an untreated resin. The treated resin shows gas decomposition at a lower temperature than the untreated resin. This demonstrates a faster activation. The faster activation is primarily due to the metal ion or the t-butyl hydroperoxide. Although the improved whiteness can be influenced by faster activation resulting in more complete blowing agent decomposition, this is not considered by applicants to be the primary mechanism for the improved whiteness in this invention. The systems tested included a PVC blending resin, which is commonly used to reduce viscosity in plastisols. The blending resin may be added in amounts up to about 50 weight percent of the dry PVC resin in the plastisol. Typically the blending resin particles comprises resin having an average particle size from about 20 to about 40 microns. Tests were performed by incorporating the additive system into a blending recipe. This also resulted in improved whiteness and activation temperature reduction over the corresponding untreated blending resin. The improvement was not of the magnitude as when making the addition to the dispersion resin but the whitening and activation effects were noticeable. This suggested that the additive system could be added to any PVC resin to obtain some degree of whitening and improved activation. Again, it is emphasized that the combination effect of the two additives together provides the highest degree of whitening to the system.

EXAMPLE III

Table III shows the whiteness difference between a foam made with additives and a foam made without additives with other formulation variables being modified. In the test shown, a potassium hydroxide/SFS(0.05/010) addition was made during the PVC polymerization process. The standard formulation was used for producing a foam with no additives of the present invention while foam produced with additives of the present invention was tested using the same formula but with the titanium oxide, azodicarbonamide and zinc oxide levels being reduced by 33%. The resin with the additives of the invention and reduced titanium oxide, azodicarbonamide and zinc oxide gave a foam color that was superior to the standard formulation foam despite the reduction of these ingredients. Blow ratios of the two foams were comparable. This phenomenon could be of particular interest to the formulator if it would allow a superior color foam product to be made with cost reductions realized from the reduced use of some costly additive ingredients.

TABLE III

|  | b color | Yid |
|---|---|---|
| Resin made with no additives in foam formula | 5.79 | 10.6 |
| Resin made with additives in foam formula with reduced $TiO_2$, activator and blowing agent | 4.62 | 8.56 |

For comparison, a number of materials were tested which were not effective to improve the foam color. These materials are shown in Table IV.

TABLE IV $AlCl_3$/SFS
$CuSO_4$/SFS
KCl/$HOCH_2CO_2H$ (glycolic acid)
KCl/$Na_2SO_4$
KCl/S ($CH_2CH_2OH)_2$ (thiodiethanol)
KSCN
NaCl
$NaClO_3$ (Na chlorate)/SFS
TBHP/$CuSO_4$
TBHP/$NaBH_4$ (Na borohydride)
TBHP/Zn metal w/$CuSO_4$
$ZnCl_2$
$ZnSO_4$ In Table V, materials are shown which actually worsened the foam color.

TABLE V $CuSO_4$
$MnCl_2$/SFS
$NaHCO_3$
$Na_2S_2O_5$ (Na meta-bisulfite or pyrosulfite) w or w/o TBHP/SFS
TBHP/$Na_2S_2O_4$ (sodium hydrosulfite)
TBHP $(NH_4)_6Mo_7O_{24}$ ($NH_4$ molybdate)
TBHP/Zn metal
$ZnCl_2$ It is believed clear that, the use of the additives of the present invention are effective to improve the whiteness and reduce the activation temperatures for the plastisol. The resulting PVC foam has improved whiteness and represents an improved product, which is believed to be producible at a lower cost.

Having thus described the invention, it is pointed out that the embodiments discussed above are illustrative rather than limiting in nature and that many variations and modifications are possible within the scope of the present invention. Many such variations and modifications may appear obvious and desirable to those skilled in the art based upon the foregoing description of preferred embodiments. Having thus described the invention, we claim:

1. A method for producing a whitened polyvinyl chloride foam, the method comprising the steps of:
   (A) incorporating in a plastisol containing dry, particulate polyvinyl chloride dispersion resin and dry, particulate polyvinyl chloride blending resin;
   (a) from about 0.01 to about 5 parts by weight per hundred parts by weight of said dry, particulate polyvinyl chloride blending resin of at least one first additive selected from the group consisting of:
      i) a sulfonic acid derivative having the formula R—$SO_3$M wherein R is an alkyl, alkylaryl or an arylalkyl group containing from 1 to 12 carbon atoms which may also contain one or more other functional groups such as hydroxyl, carboxyl or the like and wherein M is selected from hydrogen and monovalent metals;
      ii) a sulfinic acid derivative having the formula R—$SO_2$M wherein R is an alkyl, alkylaryl or an arylalkyl group consisting from 1 to 12 carbon atoms which may also contain other functional groups such as hydroxyl, carboxyl and the like and wherein M is selected from the group consisting of hydrogen and monovalent metals; and
      iii) mercapto acetic acid sodium salt;
   (b) and optionally incorporating at least one second additive selected from the group consisting of
      i) at least one water soluble metal salt selected from the group consisting of water soluble salts of alkali metals, alkaline-earth metals and transition metals; and
      ii) t-butyl hydroperoxide; and
   (B) heating the plastisol to effect expansion into whitened polyvinyl chloride foam.

2. The method of claim 1 wherein said dry, particulate polyvinyl chloride blending resin comprises resin particles having an average particle diameter from about 20 to about 40 microns.

3. The method of claim 1 wherein said dry, particulate polyvinyl chloride blending resin is present in the plastisol in an amount of up to about 50 weight percent of the dry, particulate polyvinyl chloride resin in the plastisol.

4. The method of claim 1 wherein the said plastisol contains at least about 0.001 parts by weight per 100 parts by weight of said dry, particulate polyvinyl chloride blending resin of said second additive.

5. The method of claim 1 wherein one or both of said first and second additives is added to a polymerization recipe for production of the dry, particulate polyvinyl chloride blending resin.

6. The method of claim 1 wherein one or both of said first and second additives is added to a polyvinyl chloride slurry for production of the dry, particulate polyvinyl chloride blending resin.

7. The method of claim 1 or claim 1 wherein the plastisol is heated to a temperature of from about 180 to about 210° C. to effect expansion of the plastisol into whitened polyvinyl chloride foam.

* * * * *